United States Patent [19]

Satterthwaite et al.

[11] 4,342,336

[45] Aug. 3, 1982

[54] DOUBLE-ACTING INFLATABLE SEAL

[76] Inventors: J. Glenn Satterthwaite, 1538 Lea View Ave., Norfolk, Va. 23505; Dennis M. Riddleberger, 5613 Springwood Dr., Portsmouth, Va. 23703

[21] Appl. No.: 233,240

[22] Filed: Feb. 10, 1981

Related U.S. Application Data

[63] Continuation-in-part of Ser. No. 81,511, Oct. 3, 1979, Pat. No. 4,250,926, which is a continuation of Ser. No. 699,676, Jun. 25, 1976, abandoned.

[51] Int. Cl.³ ............................................. F16L 55/12
[52] U.S. Cl. ...................................... 138/90; 138/93; 277/34
[58] Field of Search ........................... 138/90, 93, 89; 277/34.3, 34

[56] References Cited

U.S. PATENT DOCUMENTS

| 1,710,439 | 4/1929  | Taylor .................................. 138/90 |
| 2,133,730 | 10/1938 | Brundred ............................. 166/1 |
| 2,927,609 | 3/1960  | Vander Lans ...................... 138/93 |
| 3,457,959 | 7/1969  | Cooper ................................ 138/90 |
| 3,578,342 | 5/1971  | Satterthwaite et al. ........... 277/9 |
| 3,593,749 | 7/1971  | Reardon ............................. 138/93 |
| 3,689,082 | 9/1972  | Satterthwaite et al. ........... 277/34 |
| 3,722,895 | 3/1973  | Mevissen .......................... 277/34.3 |

Primary Examiner—Willis Little

Attorney, Agent, or Firm—Pollock, Vande Sande & Priddy

[57] ABSTRACT

An improved inflatable seal apparatus (10) is disclosed which includes an annular or closed loop seal element (30, 64) captured during use within an annular supporting channel (20, 54) having a somewhat T-shaped cross-section which is narrowest at its inner, or outer diameter, depending on whether the seal element displaces radially into contact with a body at its outer surface (44) or, inner surface (78), respectively. The seal element is "double-acting" and, when uninflated, is substantially completely positioned within the channel. Upon inflation of the seal element, its inner and outer walls (34, 36 and 68, 70) deflect to essentially the same extent and in the same direction while its radially extending side walls (38, 72) move radially relative to the channel to comply with the simultaneous unidirectional deflection of the inner and outer walls and thus produce a unique "double-acting" displacement. Each of the side walls of the seal element includes an axially extending flange (40, 74) to limit the radial movement of the inflated seal element within the channel upon contact with oppositely facing axially extending flanges (26, 28 and 60, 62) located in the channel, and to form a fluid tight seal between the contacting flanges. The seal element is removable from the support body (12, 46) in which the channel is located when half sections (14, 16 and 48, 50) of the body are separated.

51 Claims, 6 Drawing Figures

DOUBLE-ACTING INFLATABLE SEAL

DESCRIPTION

Cross-Reference to Related Application

This application is a continuation-in-part of our co-pending application Ser. No. 081,511 filed Oct. 3, 1979, and entitled Closure Device with Peripheral Double-Acting Inflatable Seal, now U.S. Pat. No. 4,250,926, which was a continuation of Ser. No. 699,676 filed June 25, 1976, now abandoned, the disclosures of which are hereby incorporated by reference into the present application.

TECHNICAL FIELD

The present invention relates in general to an inflatable seal apparatus. More particularly, the invention concerns such a seal for use on a closure device insertable into a correspondingly shaped opening prior to inflation of the seal element, to completely or partially close the opening after inflation as been completed. The invention also concerns such a seal for use between stationary, sliding, or rotating conduits or shafts and support bodies on which the seal is mounted and through which the conduit or shaft passes.

Background Art

Various types of closure devices have been developed over the years for sealing large and small diameter bores, pipes, passages, openings and the like to prevent leakage of a pressurized test medium, the contents of a container or compartment, or similar unwanted movement of fluent material from one point to another. To effectively close such passages, prior art closures have been very precisely dimensioned to fit within the passageway, or have been loosely fitted and provided with various types of expandible or non-expandible seal elements to close the clearance between the closure and the passageway; or have included some combination of controlled dimensions and seal elements. Inflatable "balloon" type seals such as have been used for such purposes, however, are limited to rather low inflation pressures and, unless extreme care is taken, are subject to frequent failures due to overpressurization which causes rupture of the seal walls.

Similarly, stationary, sliding or rotating conduits or shafts often require a type of seal between the conduit or shaft and a surrounding support structure. In addition to the previously discussed inflatable closure devices, various solutions to such problems have been proposed, including carefully dimensioned fits between shaft and support structure, compression type resilient seal rings, labyrinth seals, packing glands and the like, as will be familiar to those skilled in the mechanical arts. Varying degrees of success have been achieved with such prior art types of seals; however, a need has continued to exist for a simple, rugged, reliable and controllable or adjustable seal apparatus which could be used between a shaft or the like and its support structure and which would not require such precise dimensioning of the shaft and support structure in order to achieve either a complete seal or any desired degree of seal, as required for a particular application.

DISCLOSURE OF THE INVENTION

An object of the present invention is to provide a simple, rugged and inexpensive seal apparatus having an improved inflatable seal element.

A further object of the invention is to provide a seal apparatus which includes an inflatable, "double-acting" seal element in which inflation of the seal element produces minimum distension or stretching of the walls of the seal element.

Yet another object of the present invention is to provide an inflatable seal element which can be arranged to deflect its radially inner wall into contact with a shaft or conduit passing through the seal element; to deflect its radially outer wall into contact with a cylindrical bore or otherwise shaped aperture surrounding the seal element; or to deflect simultaneously both its radially inner and outer walls into respective contact with adjacent surfaces passing through and surrounding the seal element.

Still another object of the present invention is to provide an improved inflatable seal element which is useful for sealing between stationary, sliding, or rotating elements.

A further object of the present invention is to provide an improved inflatable seal element mountable on a support body and provided with both inner and outer walls which can be constrained by the support body in such a way as to undergo substantially equivalent deflections in the same direction upon inflation or deflation of the seal element.

A still further object of the invention is to provide a rugged and inexpensive, "double-acting" inflatable seal element which is formed from a length of unstressed elastomeric stock bent into circular, or non-circular, closed loop shape with its ends adhesively bonded together.

Another object of the invention is to provide such a seal element which may be formed from a length of elastomeric stock bent into a closed loop shape with its ends bonded together without any need for vulcanization.

Yet another object of the invention is to provide an improved inflatable seal element insertable between adjacent bodies and provided with inner and outer walls which can undergo substantially equal deflections in radially opposite directions upon inflation or deflation of the seal element.

The foregoing objects of the present invention are provided only by way of example; thus, those skilled in the art may perceive other desirable objectives and advantages inherently achieved by the disclosed seal structure. Nonetheless, the scope of the invention is to be limited only by the appended claims.

In its simplest embodiment, an improved inflatable seal apparatus according to the present invention comprises an annular, hollow seal element having an inner wall for contacting a first surface and an outer wall for contacting a second surface. By "annular" is meant that the seal element has a closed loop shape which may be circular, oblong, rounded-rectangular or the like. The inner wall of such a seal element is under substantial compressive stress when the seal element is uninflated; whereas, the outer wall is under substantial tensile stress when the seal element is uninflated. Means are provided for inflating the seal element, whereby upon inflation both the inner and outer walls are deflected radially from their uninflated positions to effect a seal at least against one of the first and second surfaces and to remain in contact with the outer surface. Depending upon the application, such radical deflection of the walls may be totally inward, totally outward or in opposite directions.

In the preferred embodiment of the invention, the seal element is formed from one or more initially noncircular lengths of substantially unstressed elastomeric stock material, such as extruded rubber, which is subsequently formed into a closed loop configuration, with its initially free ends congruently joined by a suitable adhesive. By forming the seal element in this manner, the previously mentioned compressive and tensile stresses are induced in the seal element at its inner and outer walls, prior to inflation.

The seal apparatus according to the invention may be used to provide an outwardly movable seal between a support body and a surrounding opening such as a cylindrical bore or otherwise shaped opening. Or, the seal apparatus according to the invention may be used to provide an inwardly movable seal between a support body and an object such as a cylindrical body located in the central opening of the seal element. Regardless of which of these two arrangements of the seal apparatus is used, the support body preferably includes either an inwardly or an outwardly opening channel within which the seal element is located. The channel includes oppositely facing, axially extending flanges on its side walls which cooperate with axially extending flanges on the seal element to limit the degree of inward or outward movement of the seal element upon inflation and to provide a seal. Typically, inflation of the seal element is accomplished through a conventional air valve similar to those used on pneumatic tires. In another application of the invention, the seal element may be positioned between but be initially unconstrained by two adjacent bodies; so that upon inflation, it deflects both radially inwardly and outwardly into sealing contact with both bodies.

Although the particular cross-sectional geometry of the seal element may vary considerably without departing from the scope of the invention, the seal element typically comprises axially spaced end walls which join the previously mentioned inner and outer walls, the thickness of the end walls being substantially equal to one-fifth the axial distance between the exterior surfaces of the end walls. The inner and outer walls of the seal element preferably are of a similar, uniform thickness, this similar thickness being substantially equal to the thickness of the end walls. At the midpoints of the inner and outer walls, a slight crown in the walls helps define a central cavity. In one actual embodiment, the inner and outer walls of the annular seal element are nearly parallel when the seal element is uninflated and the end walls of the seal element are substantially perpendicular to the longitudinal axis of the seal element. Within the seal element, the elongated central cavity, in cross section, has a major axis substantially equidistantly situated between the exterior surfaces of the inner and outer walls and extending more than half of the distance between the exterior surfaces of the end walls of the seal element. The midpoint of this major axis preferably is substantially equidistantly spaced from the exterior surfaces of the side walls. The central cavity also has a minor axis measuring only a small fraction of the length of the major axis when the seal element is uninflated. The geometrical relationship among the thicknesses of the inner and outer walls and the end walls, and the axial length of the seal element is designed to ensure that the opposed tensile and compressive forces induced upon formation of the seal element are of sufficient magnitude to produce the desired degree of "double-acting" deflection upon inflation of the seal element.

To facilitate installation and removal of the seal element onto and from its support body, the support body is made in separable half sections which are joined at the channel which houses the seal element. When the half sections are separated, the seal element may be easily slipped over or into one half section after which the other half section is easily attached, thereby completing the retaining channel for the seal element. The double-acting feature of the seal element particularly facilitates use of such a split-support housing. The seal element may be provided with flanges on its sides which seal against the side walls of the channel, leaving the axially extending wall of the channel free from the necessity of providing a leakproof joint between half sections.

BEST MODE FOR CARRYING OUT THE INVENTION

Figure 1:
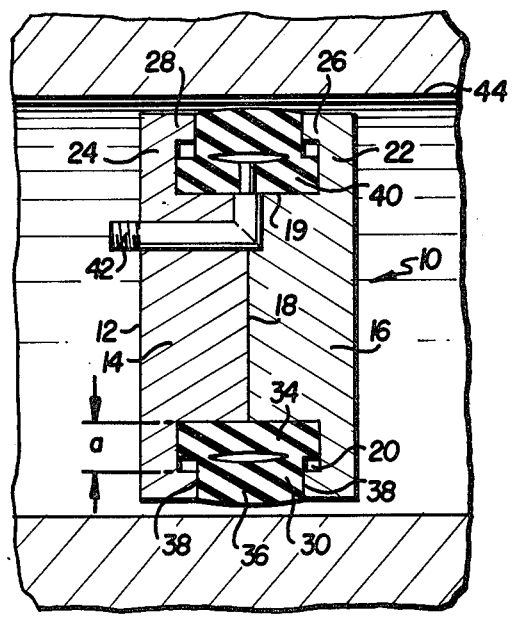
FIG. 1 shows a fragmentary sectional view of an inflatable seal apparatus according to the invention in which the seal element is arranged for radially outward movement into contact with a surrounding cylindrical bore.

The following is a detailed description of the preferred embodiments of the invention, reference being made to the drawings in which like reference numerals identify like elements of structure in each of the several Figures.

Figure 2:
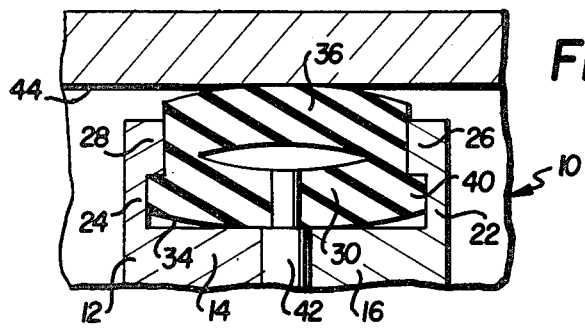
FIG. 2 shows a fragmentary sectional view of the apparatus illustrated in FIG. 1 following inflation of the seal element.

Referring to FIGS. 1 and 2, the inflatable seal apparatus 10 according to the invention may be seen to comprise a support body 12 which may be made of metal or a suitably rigid plastic or the like. Body 12 preferably is made of separate half sections 14, 16 which in use are rigidly joined together by suitable fastening means (not shown). The parting surface 18 between half sections 14, 16 terminates at the inner, axially extending surface 19 of an essentially T-shaped channel 20 which opens radially outwardly from support body 12. A pair of radially outwardly extending flanges 22, 24 define the side walls of channel 20. Spaced from inner surface 19 of channel 20 and integral with flanges 22, 24 are a pair of axially oppositely facing stop and seal flanges 26, 28. In the illustrated embodiment, flanges 26, 28 are located at the outer extremity of flanges 22, 24; however, flanges 26, 28 also may be located at an intermediate location along flanges 22, 24 without departing from the scope of the present invention. Although the embodiment illustrated in FIG. 1 is essentially right circular cylindrical in shape, other closed loop configurations may be used without departing from the scope of the invention, such as in fluid tight bulkhead doors which may be more rectangular than cylindrical.

Figure 3:
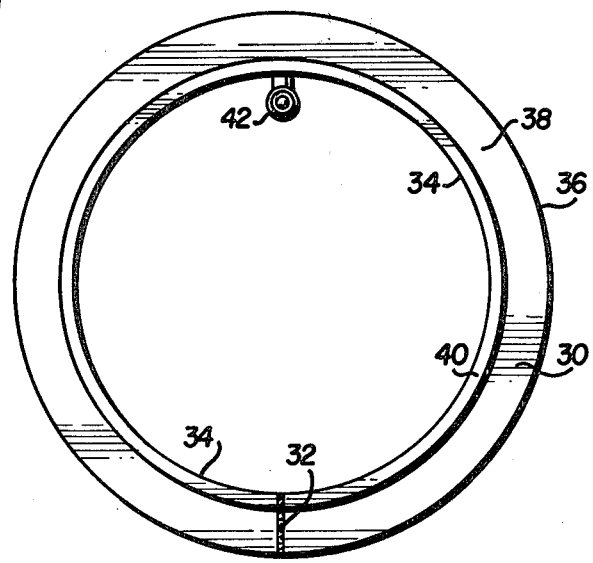
FIG. 3 shows a plan view of a seal element of the type used in the embodiment of FIGS. 1 and 2.

A double-acting annular seal element 30, formed of a suitable elastomeric material such as extruded rubber, is positioned within channel 20. Seal element 30 comprises a body portion preferably formed from unstressed elastomeric stock which is cut to a predetermined length and then bent into a closed loop, or annular, configuration so that its ends are brought substantially into congruent contact, as shown in FIG. 3. The free ends of this length of stock material are adhesively bonded together by means of a suitable adhesive 32 such as a cyanoacrylate resin. Commercially available adhesives which have been found to be suitable for this purpose include, but are not limited to Duhesive 300 manufactured by DuBois Chemicals, Cincinnati, Ohio 45202; and Loctite 404 manufactured by Loctite Corporation, Newington, Conn. 06111, both of which are anaerobic cyanoacrylates. Although the invention is not limited to the use of any particular adhesive 32, the cyanoacrylates are preferred. Such adhesives are generally based on the alkyl 2-cyanoacrylates such as methyl 2-cyanoacrylate, and have excellent polymerizing and bonding properties.

Seal element 30 has a cross-sectional configuration which preferably is substantially rectangular in shape when the seal in uninflated. Of course, other shapes such as flat ovals or squares may also be used. In the uninflated condition, seal element 30 comprises an inner wall 34 having an exterior surface of substantially the same diameter as or of a slightly greater diameter than that of inner surface 19 of channel 20. The uninflated seal element also has an outer wall 36 having an exterior surface of substantially the same diameter as the outer cylindrical edges of flanges 22, 24. The distance between the substantially parallel outer surfaces of the side walls 38 of the annular seal element 30 is slightly less than the distance between the axially opposed faces of flanges 26, 28. Each of side walls 38 is provided, adjacent the radially inner edges thereof, with an integral rectangularly shaped annular flange 40. The axially measured distance between the planar end faces of flanges 40 preferably is slightly less than the distance between the axially opposed faces of flanges 22, 24. The radially measured thickness of flanges 40 is approximately half the radially measured distance a between inner surface 19 of channel 20 and the radially innermost walls of flanges 26, 28. Distance a should be essentially equal to twice the maximum anticipated radial displacement d of the seal element in a specific application, as will be discussed with respect to FIG. 4. Equal sharing of the "double-acting" deflection by walls 34 and 36 is best accomplished when the axially measured thickness of side walls 38 of seal element 30 is equal to approximately one-fifth of the total distance L between their parallel exterior faces. See FIG. 4. The radially measured thickness of inner wall 34 and outer wall 36 is approximately equal to that of side walls 38; however, inner wall 34 and outer wall 36 typically crown slightly at the midpoints thereof. Therefore, when seal element 30 is uninflated, inner wall 34, outer wall 36 and side walls 38 enclose a central cavity 37 having a major axis which extends approximately three-fifths of the distance along the axial dimension of the seal element, the cavity having sharp side edges. Between these side edges, the cavity has a minor axis with a radial height which measures only a small fraction of the distance between the sharp side edges.

Figure 4:
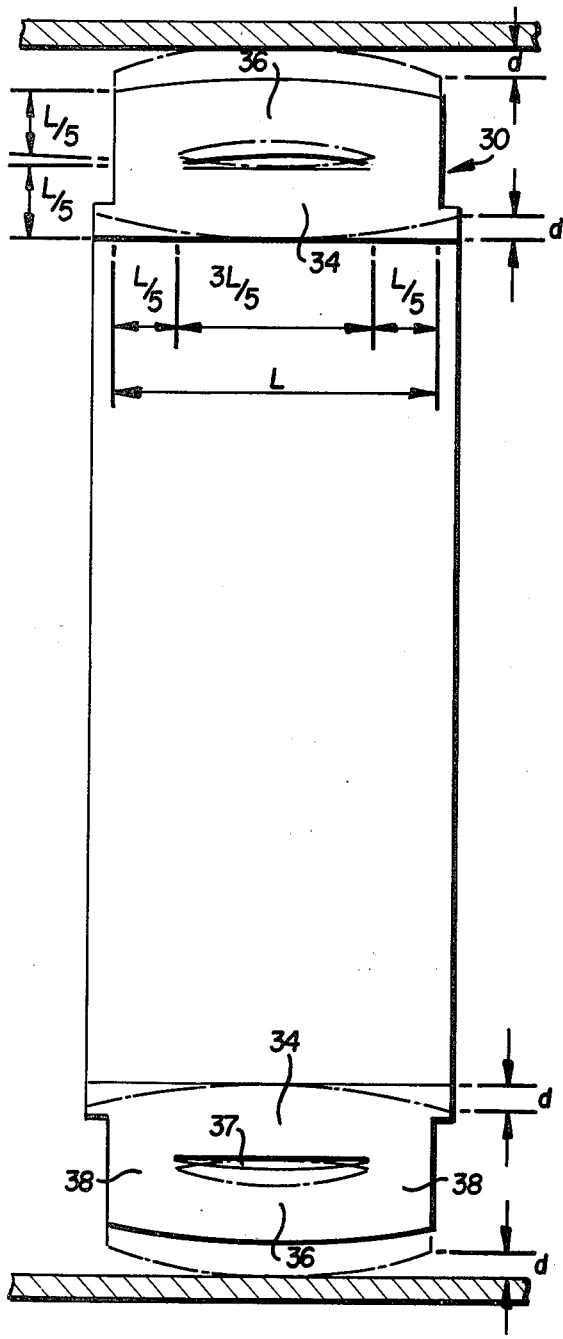
FIG. 4 shows a schematic cross-section of a seal element according to the invention, indicating the relative sizes of various components.

FIG. 4 illustrates schematically the various deflections and dimensions to be considered when determining the geometry of a seal element for a particular application. The uninflated configuration of the seal element is shown in full lines and the inflated configuration is shown in dashed lines. The specific seal element geometry shown is that of the embodiment shown in FIGS. 1 to 3; however, the following discussion also applies to the embodiment of FIGS. 5 and 6.

Manufacturing tolerances and limitations in the field have shown that the total or combined radial displacement which will be required of seal element 30 during use is determined essentially by the overall size and condition of the aperture to be sealed. That is, the larger the aperture or conduit, the greater will be the required total displacement in most instances. This is due to the relatively larger diametral tolerances, greater out-of-roundness, presence of internal obstructions such as weld backing rings, and other variations found more often in larger apertures or conduits than in smaller ones. For example, in a forty-two inch pipe, the total radial displacement may be about 1.2 inches, whereas, in a 96 inch pipe, it may be about 1.8 inches.

Preferably, the essentially equal maximum radial displacements d of inner wall 34 and outer wall 36, as shown in FIG. 4, should not exceed 0.075 times the axial length L of the seal element in order to hold stresses in the adhesively bonded joint 32 at reasonable levels. Thus, the total radial displacement of the seal element, which essentially equals 4d, preferably should not exceed 0.3 times L. Therefore, once the maximum anticipated radial displacement d has been reliably estimated for a given application, the axial length L between side walls 38 of seal element 30 may be determined. To determine this maximum anticipated displacement, the outer diameter of body 12 is selected with adequate clearance to the minimum anticipated inner diameter of the surrounding cylindrical bore 44. For a given maximum anticipated diameter of bore 44, the maximum anticipated radial displacement d will then be approximately one-fourth the difference between the outer diameter of body 12 and the maximum diameter of bore 44.

Seal element 30 is provided with a stem type air valve 42 of the type conventionally provided on pneumatic tires or inner tubes therefor. Valve element 42 extends from central cavity 37 of the seal element through passageways provided in separate half sections 14, 16.

Experience with the manufacture of seal element 30 indicates that particular care should be taken when preparing and bonding the free ends of the length of elastomeric stock. The ends of the length of stock may be cut perpendicular to or at an angle to the longitudinal axis of the stock; however, the cutting blade should be maintained at essentially the same angle relative to the axis of the stock when the two ends of the length of stock are cut. In actual practice, a straight-edged, extremely sharp stainless steel blade has been used with good results. The sides of the blade preferably are secured in suitable guides so that the blade angle is maintained essentially constant during each cut and from cut to cut, rather in the manner of a guillotine. The stock material is held in place beneath the blade and both the blade and the stock preferably are lubricated with soapy water or the like to facilitate cutting. After the first end cut is made, the stock preferably is pulled on through beneath the cutting blade to the desired location of the second end cut. The second end cut thus will be essentially identical in geometry with the first, so that when the stock is bent into a closed loop form, its ends will be congruent. Air valve 42 is then installed in the length of stock, preferably near its midpoint, using an appropriate amount of cyanoacrylate adhesive to prevent subsequent leakage.

The precut length of stock is then rinsed carefully with water to remove all residue of the soapy water or other lubricant and dried with low moisture content air. So that the adhesive 32 does not cure too rapidly during formation of the joint, the air in the environment preferably is maintained at 30 to 40% relative humidity and normal room temperature. The free ends of the length of stock then are clamped around their perimeters and a very thin layer of adhesive 32 is applied to the cut surface of one free end. To ease application of a thin layer of the adhesive, means such as a spatula made from or coated with polytetrafluoroethylene may be used. To prevent dripping or running of the adhesive once it has been applied, the cut surface of the one free end preferably is held in a horizontal position.

Once the adhesive has been applied, the cut surfaces of both free ends are brought into congruent contact and clamped together with a force of approximately 500 to 1000 pounds per square inch at the interface between the cut surfaces. This high pressure is applied to induce molecular flow and polymerization through substantially 100% contact at the interface, thereby ensuring a good joint. Any excess adhesive squeezed outwardly may be wiped away. Two or more lengths of stock may be used to form a single seal element, but each joint must be similarly prepared. The high clamping pressure is maintained for ten to fifteen minutes to ensure adequate initial bonding, after which the seal element may be removed from its clamps. The resulting joint is virtually undetectable and very strong.

If the seal element is to be restrained against inward radial movement during use, as in the embodiment of FIGS. 1 to 4, it is then placed on a curing drum having the same outer diameter as inner surface 19. However, the seal element is otherwise unconstrained. The seal element is then pressurized to from 50 to 100% of the pressure which will be required to achieve full radial deflection during use. After about 24 hours curing in this pressurized state, the completed seal element is deflated and removed from its curing drum. If the seal element is to be restrained against outward radial deflection during use, as in the embodiment of FIGS. 5 and 6, it is placed in a curing drum having the same inner diameter as outermost surface 53; pressurized as just described; and allowed to cure for about 24 hours before removal. The use of such curing drums for inwardly and outwardly moving seals is preferred even where the aperture in which the seal is to be used is non-circular. Thus, where the seals are to be used on bulkhead doors, for example, they may be cured in a circular form after which they will comply to fit the door or door frame, without departing from the scope of the present invention. Of course, the seal element also may be cured on a fixture which matches the shape of the intended aperture, if desired. In any event, curing in the inflated posture is done to mitigate the maximum stresses experienced by the joint during actual use. Moreover, when the seal element is depressurized, the joint is subjected to some compressive stress which does not cause the adhesive to fail.

The seal apparatus shown in FIGS. 1 to 4 is assembled by slipping uninflated seal element 30 into that portion of channel 20 which is defined by one of separate half sections 14, 16 and then slipping the other half section onto the exposed portion of seal element 30, taking care to ensure that air valve 42 is properly positioned. Then, when the assembled seal apparatus is inserted into a surrounding cylindrical bore 44 and seal element 30 is pressurized through valve element 42, the seal ring deflects to the configuration shown in FIG. 2. Outer wall 36 seals against bore 44; inner wall 34 contacts inner surface 19 of channel 20; and flanges 40 seal against flanges 26, 28.

An important aspect of the invention concerns the cross-sectional configuration of seal element 30 and its cooperation with the cross-sectional configuration of essentially T-shaped channel 20. When seal element 30 has been formed from a predetermined non-circular length of unstressed stock material, as previously discussed, central cavity 37 is virtually closed. Substantial circumferential compressive stresses are established in inner wall 34 and substantially equal circumferential tensile stresses are established in outer wall 36. A "stress balance" therefore is maintained when the measured length of the stock material prior to formation of the closed loop seal element is substantially equal to the circumferential length of the "true center line" of the cross-sectional configuration of the seal element. The "true center line" is measured halfway between the exterior surface of outer wall 36 and the exterior surface of inner wall 34. By "stress balance" is meant that in the formation of the closed loop seal element, the tensile stress induced in the outer seal wall 36 is substantially equal and opposite to the compressive stress induced in the inner seal wall 34, when seal element 30 is uninflated. As previously discussed, the total radial displacement ($4d$) of seal element 30 influences its overall cross-sectional dimensions. These dimensions have been found to assure safe, reliable operation of the adhesive joint. As the diameter of a seal element is increased without changing its cross-section, the magnitude of the opposed compressive and tensile stress induced in the inner and outer walls will decrease. However, these stresses will remain essentially balanced, if the seal element is configured as shown in the Figures. Due to this balance of stress, the "double-action" of the seal element will always manifest itself when inflation of the seal element upsets the balance in the manner previously discussed.

When seal element 30 has been shaped and formed in the manner just discussed and mounted within essentially T-shaped channel 20, a unique action occurs when the seal element is inflated by admitting air into its central cavity through air valve element 42. Since the inner wall 34 of the seal element can move only a slight distance radially inwardly toward the axis of support body 12, nearly all deflection of the seal element upon inflation must take place in the radially outwardly direction. As a result, the tensile stress in outer wall 36 is increased, while the compressive stress in inner wall 34 is decreased as flanges 40 move outward toward flanges 26, 28. This upsets the stress balance. Consequently, as shown in FIGS. 2 and 4, both inner wall 34 and outer wall 36 deflect outwardly to a substantially equal extent (d) and thus contribute substantially equally to the outward movement of the axial midpoint of the exterior surface of outer wall 36. Outer wall 36 becomes outwardly convex; whereas, inner wall 34 becomes inwardly convex, as illustrated. Simultaneously, side walls 38 move radially outwardly approximately the same distance which the axial midpoint of the exterior surface of outer wall 36 moves upon inflation of annular seal element 30. For these reasons, seal element 30 may be correctly referred to as an inflatable, "double-acting" seal element.

While both inner wall 34 and outer wall 36 of seal element 30 do deflect a substantially equal amount d during the desired outward displacement of the axial midpoint of outer wall 36, the degree of deflection experienced by each of such walls is only approximately half that which would be experienced by the outer wall 36 if inner wall 34 did not also deflect upon inflation of the seal element. This reduced deflection of inner wall 34 and outer wall 36 permits the use of an essentially non-elastic type adhesive 32 to join the ends of a length of unstressed stock material to form such a seal element. Such adhesives typically become quite brittle after they have cured. Thereafter, such a bonded joint will withstand very high loading applied in a direction normal to its plane; will withstand only a very slight bending in its plane; and will not withstand stresses in its plane which are caused by expansion or elongation of the abutting surfaces joined together. Obviously, the generation of stresses which would fracture adhesive layer 32 would cause leakage of air from the central cavity of annular seal element 30. However, the design of seal element 30 and its T-shaped constraining channel 20 is such that the stresses developed in the bonded joint do not exceed the elastic limits which the adhesive is capable of withstanding.

Referring to FIGS. 2 to 4, it will be seen that when seal element 30 is inflated, its inner wall 34 and outer wall 36 deflect to substantially the same degree while its side walls 38 move out of channel 20 to permit such equal deflection of walls 34 and 36. When outer wall 36 of seal element 30 has been brought into firm contact with the wall of cylindrical bore 44, the radially outermost wall of flanges 40 contacts and forms a seal against the radially innermost wall of flanges 26, 28. The cross-sectional configuration of the inflated seal element 30 thereafter remains essentially the same so long as inflation pressure is maintained. In this configuration, the bending stresses generated by deflection of walls 34, 36 are insufficient to fracture the adhesive 32. Without the double-acting feature of the present invention, the joint of seal element 30 would have to be bonded by vulcanization to provide adequate strength at the joint, thereby greatly increasing the cost of manufacture.

Figure 5:
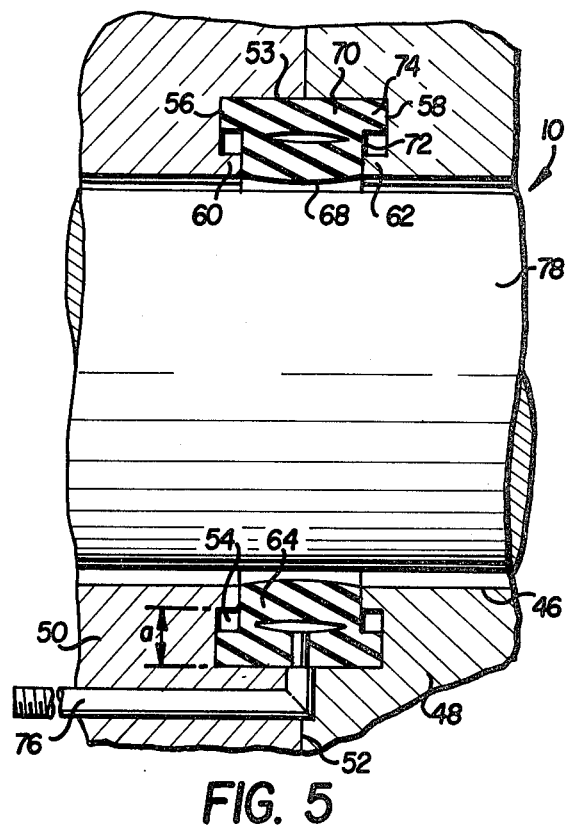
FIG. 5 shows a fragmentary, partially sectional view of a further embodiment of the invention in which the seal element moves radially inwardly upon inflation.
Figure 6:
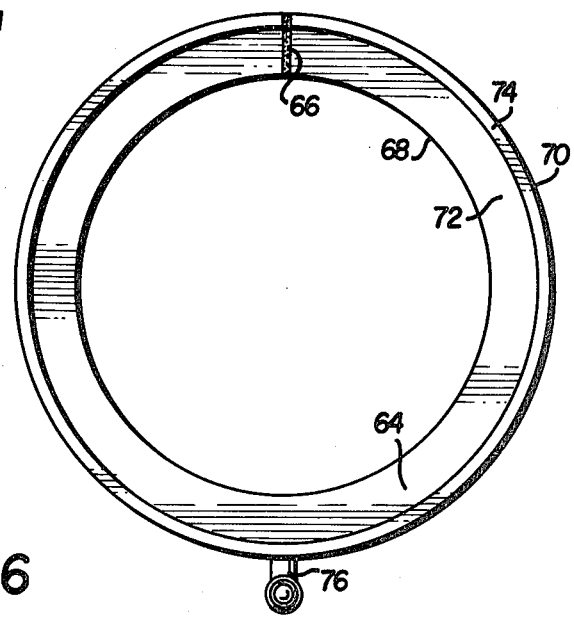
FIG. 6 shows a plan view of a seal element of the type used in the embodiment of FIG. 5.

FIGS. 5 and 6 illustrate a further embodiment of the invention in which the seal element and its support body are configured to permit radially inward movement of the seal element. A support body 46 is provided which is formed from separable half-sections 48, 50 that define a central cylindrical bore. The parting surface 52 between half-sections 48, 50 terminates at the radially outermost surface 53 of an essentially T-shaped channel 54 which opens radially inwardly into the bore defined by separate half-sections 48, 50. Channel 54 is defined by a pair of radially inwardly extending walls 56, 58 which terminate in a pair of axially oppositely facing flanges 60, 62. Within channel 54 is located a double-acting seal element 64 which, like seal element 30, is formed from an initially unstressed length of elastomeric stock material, the end portions of which are joined by a layer 66 of suitable adhesive. Seal element 64 includes an inner wall 68 and an outer wall 70 joined by side walls 72, in the manner previously discussed with regard to seal element 30. A rubber flange 74 extends axially from side walls 72 at the radially outermost portion thereof, in position to cooperate with oppositely facing flanges 60, 62 in the manner previously discussed. An air valve element 76 is provided for inflating seal element 64 so that it expands radially inwardly into contact with a cylindrical body 78 located within the bore defined by separate half-sections 48, 50. Thus, seal element 64 is double-acting and is structurally identical to seal element 30 except for the placement of flanges 74 and valve element 76.

In the foregoing description of seal elements according to the present invention, the seal element is shown mounted in a support body which constrains either its inner or outer surface against radial movement upon inflation. However, seal elements 30, 64 also may be used in applications where there is substantial, preferably equal, radial clearance between the seal element and the adjacent surfaces with which seals are to be made. For these applications, the total radial displacement is related to the axial length just as previously described with respect to FIG. 4. Moreover, no curing drum is used for such seal elements during their 24-hour cure while inflated. In use, such a seal element will deflect essentially equally in opposite directions until the radially inner or outer wall of the seal element makes contact. Thereafter, the seal element will undergo double-acting displacement as previously described. When both the inner and outer walls contact simultaneously, further deflection of the inner and outer walls occurs without any substantial movement of the side walls.

Also in the foregoing description, the inner and outer axially extending walls of the seal element are said to be of essentially equal thickness. This geometry is preferred since it causes the seal elements to deflect equally at both walls. However, by making one axially extending wall thicker than the other, the deflection of the walls upon inflation will change inversely, though double-acting will still be experienced. Such a variant is within the scope of the present invention.

Having described our invention in sufficient detail to enable those skilled in the art to make and use it, we claim:

1. An inflatable, double-acting seal apparatus, comprising:
   an annular, hollow seal element having an inner wall for contacting a first surface, said inner wall being under circumferential compressive stress when said seal element is uninflated, and an outer wall for contacting a second surface, said outer wall being under circumferential tensile stress when said seal element is uninflated; and
   means for inflating said seal element, so that upon inflation said inner wall and said outer wall will displace radially inwardly and outwardly, respectively, from their uninflated positions until contact is established with one of said first and second surfaces, whereupon further displacement of at least a portion of both said inner and outer walls occurs in the direction of the other of said first and second surfaces.

2. A seal apparatus according to claim 1, wherein said seal element is formed from at least one initially unstressed length of stock material subsequently formed into a closed loop with the initially free ends thereof congruently adhesively bonded together, whereby said compressive and tensile stresses are induced in said seal element prior to inflation.

3. A seal apparatus according to claim 2, wherein said seal element comprises axially spaced end walls joining said inner and outer walls, the thickness of each of said end walls being substantially equal to one-fifth the axial distance between the exterior surfaces of said end walls; and said inner and outer walls are of a similar thickness substantially equal to said thickness of said end walls.

4. A seal apparatus according to claim 3, wherein said end walls of said seal element are parallel to each other and perpendicular to the axis of said seal element.

5. A seal apparatus according to claim 1, wherein said first surface is provided in a body which extends through said seal element and said second surface is provided in a body which surrounds said seal element, said seal element being effective upon inflation to seal against both of said surfaces.

6. An inflatable, double-acting seal apparatus, comprising:
 a cylindrical body having a first surface;
 a support body having a cylindrical bore surrounding said cylindrical body and a radially inwardly opening channel extending around said cylindrical bore, said channel having a second surface;
 an annular hollow seal element having an inner wall for contacting said first surface, said inner wall being under circumferential compressive stress when said seal element is uninflated, and an outer wall for contacting said second surface, said outer wall being under circumferential tensile stress when said seal element is uninflated; and
 means for inflating said seal element, so that upon inflation said inner wall and said outer wall will displace radially inwardly and outwardly, respectively, from their uninflated positions until contact is established with one of said first and second surfaces, whereupon further displacement of at least a portion of both said inner and outer walls occurs in the direction of the other of said first and second surfaces.

7. A seal apparatus according to claim 6, wherein said support body is separable into sections at said radially inwardly opening channel, to facilitate insertion and removal of said seal element.

8. A seal apparatus according to claim 6, wherein said inner and outer walls of said seal element are substantially parallel when said seal element is uninflated, further comprising a pair of side walls joining said inner and outer walls, at least a portion of the exterior surface of each of said side walls being substantially perpendicular to the longitudinal axis of said seal element, said walls enclosing an elongated central cavity having a major axis substantially equidistantly situated between the exterior surfaces of said inner and outer walls and extending more than half of the distance between said exterior surfaces of said side walls with the midpoint of said major axis being substantially equidistantly spaced from said exterior surfaces of said side walls; said elongated central cavity also having a minor axis measuring only a small fraction of the length of said major axis when said seal element is uninflated.

9. A seal apparatus according to claim 6, wherein said inflating means comprises an air valve extending radially through said support body into said seal element.

10. A seal apparatus according to claim 6, wherein said radially inwardly opening channel comprises axially spaced side walls extending inwardly from said second surface, each side wall having at least one stop flange extending axially into said inwardly opening channel; and said seal element comprises at least one pair of oppositely facing, axially extending flanges situated radially outwardly relative to said at least one stop flange, whereby inward radial displacement of said seal element upon inflation is limited by contact of said flanges and a seal is formed between said flanges.

11. A seal apparatus according to claim 10, wherein said axially spaced side walls of said inwardly opening channel are parallel to each other and perpendicular to the axis of said seal element.

12. A seal apparatus according to claim 6, wherein said seal element comprises axially spaced end walls joining said inner and outer walls, the thickness of each of said end walls being substantially equal to one-fifth the axial distance between the exterior surfaces of said end walls; and said inner and outer walls are of a similar thickness substantially equal to said thickness of said end walls.

13. A seal apparatus according to claim 12, wherein said end walls of said seal element are parallel to each other and perpendicular to the axis of said seal element.

14. An inflatable, double-acting seal apparatus, comprising:
 a support body having an outer wall with a radially outwardly opening channel extending therearound, said channel having a first surface;
 a body having a cylindrical bore surrounding said support body, said bore having a second surface;
 an annular hollow seal element having an inner wall for contacting said first surface, said inner wall being under circumferential compressive stress when said seal element is uninflated, and an outer wall for contacting said second surface, said outer wall being under circumferential tensile stress when said seal element is uninflated; and
 means for inflating said seal element, so that upon inflation said inner wall and said outer wall will displace radially inwardly and outwardly, respectively, from their uninflated positions until contact is established with one of said first and second surfaces, whereupon further displacement of at least a portion of both said inner and outer walls occurs in the direction of the other of said first and second surfaces.

15. A seal apparatus according to claim 14, wherein said inflating means comprises an air valve extending radially through said support body into said seal element.

16. A seal apparatus according to claim 14, wherein said radially outwardly opening channel comprises axially spaced side walls extending outwardly from said first surface, each side wall having at least one stop flange extending axially into said outwardly opening channel; and said seal element comprises at least one pair of oppositely facing, axially extending flanges situated radially inwardly relative to said at least one stop flange, whereby outward radial displacement of said seal element upon inflation is limited by contact of said flanges and a seal is formed between said flanges.

17. A seal apparatus according to claim 16, wherein said axially spaced side walls of said outwardly opening channel are parallel to each other and perpendicular to the axis of said seal element.

18. A seal apparatus according to claim 14, wherein said seal element comprises axially spaced end walls joining said inner and outer walls, the thickness of each of said end walls being substantially equal to one-fifth the axial distance between the exterior surfaces of said end walls; and said inner and outer walls are of a similar thickness substantially equal to said thickness of said end walls.

19. A seal apparatus according to claim 18, wherein said end walls of said seal element are parallel to each other and perpendicular to the axis of said seal element.

20. A seal apparatus according to claim 14, wherein said inner and outer walls of said seal element are substantially parallel when said seal element is uninflated, further comprising a pair of side walls joining said inner and outer walls, at least a portion of the exterior surface of each of said side walls being substantially perpendicular to the longitudinal axis of said seal element, said walls enclosing an elongated central cavity having a major axis substantially equidistantly situated between the exterior surfaces of said inner and outer walls and extending more than half of the distance between said exterior surfaces of said side walls with the midpoint of said major axis being substantially equidistantly spaced from said exterior surfaces of said side walls; said elongated central cavity also having a minor axis measuring only a small fraction of the length of said major axis when said seal element is uninflated.

21. A seal apparatus according to claim 14, wherein said support body is separable into sections at said radially outwardly opening channel, to facilitate insertion and removal of said seal element.

22. An improved inflatable seal apparatus, comprising:
a cylindrical body having a first surface;
a support body having a cylindrical bore surrounding said cylindrical body and a radially inwardly opening channel extending around said cylindrical bore, said channel having a second surface;
an annular hollow seal element having an inner wall for contacting said first surface, said inner wall being under circumferential compressive stress when said seal element is uninflated, and an outer wall for contacting said second surface, and outer wall being under circumferential tensile stress when said seal element is uninflated; and
means for inflating said seal element, whereby upon inflation said inner wall and said outer wall are displaced radially from their uninflated positions to form a seal against at least one of said first and second surfaces.

23. A seal apparatus according to claim 22, wherein said support body is separable into sections at said radially inwardly opening channel, to facilitate insertion and removal of said seal element.

24. A seal apparatus according to claim 22, wherein said inner and outer walls of said seal element are substantially parallel when said seal element is uninflated, further comprising a pair of side walls joining said inner and outer walls, at least a portion of the exterior surface of each of said side walls being substantially perpendicular to the longitudinal axis of said seal element, said walls enclosing an elongated central cavity having a major axis substantially equidistantly situated between the exterior surfaces of said inner and outer walls and extending more than half of the distance between said exterior surfaces of said side walls with the midpoint of said major axis being substantially equidistantly spaced from said exterior surfaces of said side walls; said elongated central cavity also having a minor axis measuring only a small fraction of the length of said major axis when said seal element is uninflated.

25. A seal apparatus according to claim 22, wherein said inflating means comprises an air valve extending radially through said support body into said seal element.

26. A seal apparatus according to claim 22, wherein said radially inwardly opening channel comprises axially spaced side walls extending inwardly from said second surface, each side wall having at least one stop flange extending axially into said inwardly opening channel; and said seal element comprises at least one pair of oppositely facing, axially extending flanges situated radially outwardly relative to said at least one stop flange, whereby inward radial displacement of said seal element upon inflation is limited by contact of said flanges and a seal is formed between said flanges.

27. A seal apparatus according to claim 26, wherein said axially spaced side walls of said inwardly opening channel are parallel to each other and perpendicular to the axis of said seal element.

28. A seal apparatus according to claim 22, wherein said seal element comprises axially spaced end walls joining said inner and outer walls, the thickness of each of said end walls being substantially equal to one-fifth the axial distance between the exterior surfaces of said end walls; and said inner and outer walls are of a similar thickness substantially equal to said thickness of said end walls.

29. A seal apparatus according to claim 28, wherein said end walls of said seal element are parallel to each other and perpendicular to the axis of said seal element.

30. An improved inflatable seal apparatus, comprising:
a support body having an outer wall with a radially outwardly opening channel extending therearound, said channel having a first surface and axially spaced side walls extending outwardly from said first surface, each side wall having at least one stop flange extending axially into said outwardly opening channel;
a body having a cylindrical bore surrounding said support body, said bore having a second surface;
an annular, hollow seal element having an inner wall for contacting said first surface, said inner wall being under compressive stress when said seal element is uninflated; an outer wall for contacting said second surface, said outer wall being under tensile stress when said seal element is uninflated; and at least one pair of oppositely facing, axially extending flanges situated radially inwardly relative to said at least one stop flange, whereby outward radial displacement of said seal element upon inflation is limited by contact of said flanges and a seal is formed between said flanges; and
means for inflating said seal element, whereby upon inflation said inner wall and said outer wall are displaced radially from their uninflated positions to form a seal against at least one of said first and second surfaces.

31. A seal apparatus according to claim 30, wherein said axially spaced side walls of said outwardly opening channel are parallel to each other and perpendicular to the axis of said seal element.

32. An improved inflatable seal apparatus, comprising:
an annular, hollow seal element having an inner wall for contacting a first surface, said inner wall being under compressive stress when said seal element is uninflated, and an outer wall for contacting a second surface, said outer wall being under tensile stress when said seal element is uninflated;

a first body extending through said seal element and including said first surface;

a second body surrounding said seal element and including said second surface, said seal element being effective upon inflation to seal against both of said surfaces; and means for inflating said seal element, whereby upon inflation said inner wall and said outer wall are displaced radially from their uninflated positions to form a seal against at least one of said first and second surfaces.

33. A seal apparatus according to claim 32, wherein said seal element is formed from at least one initially unstressed length of stock material subsequently formed into a closed loop with the initially free ends thereof congruently adhesively bonded together, whereby said compressive and tensile stresses are induced in said seal element prior to inflation.

34. A seal apparatus according to claim 32, wherein said first surface is cylindrical and said second body comprises a cylindrical bore surrounding said first body, said second body comprising a radially inwardly opening channel extending around said circular bore and including said second surface in position to be contacted by said outer wall upon inflation of said seal element.

35. A seal apparatus according to claim 34, wherein said support body is separable into sections at said radially inwardly opening channel, to facilitate insertion and removal of said seal element.

36. A seal apparatus according to claim 35, wherein said inner and outer walls of said seal element are substantially parallel when said seal element is uninflated, further comprising a pair of side walls joining said inner and outer walls, at least a portion of the exterior surface of each of said side walls being substantially perpendicular to the longitudinal axis of said seal element, said walls enclosing an elongated central cavity having a major axis substantially equidistantly situated between the exterior surfaces of said inner and outer walls and extending more than half of the distance between said exterior surfaces of said side walls with the modpoint of said major axis being substantially equidistantly spaced from said exterior surfaces of said side walls; said elongated central cavity also having a minor axis measuring only a small fraction of the length of said major axis when said seal element is uninflated.

37. A seal apparatus according to claim 34, wherein said inflating means comprises an air valve extending radially through said support body into said seal element.

38. A seal apparatus according to claim 34, wherein said radially inwardly opening channel comprises axially spaced side walls extending inwardly from said second surface, each side wall having at least one stop flange extending axially into said inwardly opening channel; and said seal element comprises at least one pair of oppositely facing, axially extending flanges situated radially outwardly relative to said at least one stop flange, whereby inward radial displacement of said seal element upon inflation is limited by contact of said flanges and a seal is formed between said flanges.

39. A seal apparatus according to claim 38, wherein said axially spaced side walls of said inwardly opening channel are parallel to each other and perpendicular to the axis of said seal element.

40. A seal apparatus according to claim 34, wherein said seal element comprises axially spaced end walls joining said inner and outer walls, the thickness of each of said end walls being substantially equal to one-fifth the axial distance between the exterior surfaces of said end walls; and said inner and outer walls are of a similar thickness substantially equal to said thickness of said end walls.

41. A seal apparatus according to claim 40, wherein said end walls of said seal element are parallel to each other and perpendicular to the axis of said seal element.

42. A seal apparatus according to claim 32, wherein said seal element comprises axially spaced end walls joining said inner and outer walls, the thickness of each of said end walls being substantially equal to one-fifth the axial distan-e between the exterior surfaces of said end walls; and said inner and outer walls are of a similar thickness substantially equal to said thickness of said end walls.

43. A seal apparatus according to claim 42, wherein said end walls of said seal element are parallel to each other and perpendicular to the axis of said seal element.

44. A seal apparatus according to claim 32, wherein said first body comprises a radially outwardly opening channel extending therearound and including said first surface in position to be contacted by said inner wall; and said second body comprises a cylindrical body including said second surface in position to be contacted by said outer wall.

45. A seal apparatus according to claim 44, wherein said inflating means comprises an air valve extending radially through said support body into said seal element.

46. A seal apparatus according to claim 44, wherein said radially outwardly opening channel comprises axially spaced side walls extending outwardly from said first surface, each side wall having at least one stop flange extending axially into said outwardly opening channel; and said seal element comprises at least one pair of oppositely facing, axially extending flanges situated radially inwardly relative to said at least one stop flange, whereby outward radial displacement of said seal element upon inflation is limited by contact of said flanges and a seal is formed between said flanges.

47. A seal apparatus according to claim 46, wherein said axially spaced side walls of said outwardly opening channel are parallel to each other and perpendicular to the axis of said seal element.

48. A seal apparatus according to claim 44, wherein said seal element comprises axially spaced end walls joining said inner and outer walls, the thickness of each of said end walls being substantially equal to one-fifth the axial distance between the exterior surfaces of said end walls; and said inner and outer walls are of a similar thickness substantially equal to said thickness of said end walls.

49. A seal apparatus according to claim 48, wherein said end walls of said seal element are parallel to each other and perpendicular to the axis of said seal element.

50. A seal apparatus according to claim 44, wherein said inner and outer walls of said seal element are substantially parallel when said seal element is uninflated, further comprising a pair of side walls joining said inner and outer walls, at least a portion of the exterior surface of each of said side walls being substantially perpendicular to the longitudinal axis of said seal element, said walls enclosing an elongated central cavity having a major axis substantially equidistantly situated between the exterior surfaces of said inner and outer walls and extending more than half of the distance between said exterior surfaces of said side walls with the midpoint of said major axis being substantially equidistantly spaced from said exterior surfaces of said side walls; said elongated central cavity also having a minor axis measuring only a small fraction of the length of said major axis when said seal element is uninflated.

51. A seal apparatus according to claim 44, wherein said support body is separable into sections at said radially outwardly opening channel, to facilitate insertion and removal of said seal element.

* * * * *